Patented Aug. 23, 1927.

1,639,983

UNITED STATES PATENT OFFICE.

BRUCE K. BROWN, OF TERRE HAUTE, INDIANA, ASSIGNOR, BY MESNE ASSIGNMENTS, TO C. F. BURGESS LABORATORIES, INC., OF DOVER, DELAWARE, A CORPORATION OF DELAWARE.

GALVANIC CELL.

No Drawing. Application filed July 7, 1925. Serial No. 42,090.

The present invention relates to galvanic cells and more particularly to dry cells of the Leclanche type, wherein a solid depolarizing material is present at one electrode to oxidize the hydrogen there set free.

Dry batteries of the Leclanche type as now constructed contain manganese dioxide in one or more of its forms or combinations as the depolarizing material. I have discovered that this manganese dioxide may be partly or entirely replaced by certain oxides of carbon, with new and unexpected results.

When carbonaceous materials, especially those graphitic in character, are subjected to highly oxidizing reagents, such as the Brodie mixture, (Phil. Trans., 149, p. 249, 1859,) which consists of potassium chlorate and fuming nitric acid, the carbon is largely oxidized to a solid oxide or a mixture of solid oxides. If the Brodie oxidation is repeated a sufficient number of times, the end product is yellow in color, the intensity of the yellow depending upon a number of factors, such as the raw material, temperature of the solution, sunlight, etc. During the intermediate stages, the product may be black, gray, green or any of the variety of colors resulting from a mixture of these and different shades of yellow that may approach white in some cases. Since the oxidation proceeds slowly from the exterior to the interior of the carbonaceous particles, the black unchanged core is the cause of much of the variation in color. Chemical and microscopic tests confirm this.

While the Brodie mixture is the reagent generally used to obtain these solid oxides of carbon, other mixtures having a highly oxidizing reaction may also be used, such as a mixture of sulphuric acid and potassium chlorate or a mixture of sulphuric and chromic acids.

I have found that these solid oxides of carbon may be produced electrochemically, this being the subject of a companion application Serial No. 42,091 filed July 7, 1925.

The solid oxides of carbon produced by the above methods are colloidal, as shown by Hulett and Nelson in a paper before the American Electrochemical Society in April, 1920. (Vol 37, page 103). These oxides deflagrate when heated to a comparatively low temperature and may be readily recognized because of this peculiar property. Carbonaceous material which has been only partially oxidized and is still black in color also will deflagrate when heated.

I have discovered that these solid oxides of carbon readily oxidize ferrous sulphate in acid solution, such as is used to determine the available oxygen in manganese dioxide. A large part of the oxygen is liberated under these conditions and the yellow oxide returns to the carbonaceous condition. This reaction therefore allows the available oxygen content to be readily determined, in contrast to the cumbersome and untrustworthy combustion methods heretofore used, which sought the total oxygen content.

The chemistry of the formation of these solid oxides of carbon has been the subject of considerable study but few investigators agree in their findings. The exact composition of the oxides is unknown.

Previous to the publication of the results of Hulett and Nelson, it was generally believed that the product resulting from the oxidation of graphite contained hydrogen chemically combined with carbon and oxygen. As a result, this yellow product was often called graphitic acid. Hulett and Nelson show definitely that the hydrogen obtained by the earlier investigators was present in the form of water which could not be removed because of the colloidal nature of the material. Hulett and Nelson state that the yellow oxide obtained from graphite corresponds approximately to $C_{11}O_4$. However, neither Hulett and Nelson nor previous investigators have shown that the yellow product is a definite oxide. Some investigators have suggested that a series of oxides exist rather than a definite oxide such as $C_{11}O_4$. The variable appearance of the oxide made from different carbonaceous products gives a basis for the contention that a series of oxides does exist. My invention is not to be construed as limited to any definite oxide, but includes the oxide or series of oxides of carbon which have the property of depolarizing, whatever may be the exact chemical composition thereof.

Whether the yellow or graphitic oxide of carbon may be obtained from carbonaceous materials other than graphite, is another point which is not agreed upon by experts. Some maintain that graphitic oxide can only be obtained from graphite, while others maintain that other forms of carbon yield this oxide. This disagreement is primarily due to a difference of opinion on the correct definition for graphite. Some experts maintain that the highly crystalline unctuous form of carbon known as Ceylon graphite and artificially made by Acheson is the only true form of graphite, while others maintain that graphite is that form of carbon which yields graphitic oxide. Many forms of carbon which yield graphitic oxide are not unctuous or crystalline and do not possess all of the properties possessed by Ceylon and similar graphites. Highly calcined lamp black is an example. Whether these forms of carbon may be called graphite is a matter of definition, but it is certain that they are different from those forms of carbon that do not form graphitic or solid oxides when subjected to the Brodie mixture or similar oxidizing mixtures or reactions. Commercial charcoal and uncalcined lampblacks dissolve completely under these conditions, that is to say, they do not form the oxides under discussion.

I have found that it is possible to secure an oxide of carbon, similar in properties to graphitic oxide, by subjecting ordinary calcined coke to highly oxidizing conditions, though the yield is much lower than with Acheson graphite. Whether this low yield is due to the presence of comparatively small quantities of graphite in the coke, or whether it is due to a difference of solubility, or whether it is due to the formation of a slightly different oxide I have not been able to determine. W. A. Selvig and W. C. Ratliff of the U. S. Bureau of Mines, whose investigations on graphitic oxide are published in the 37th volume of the Transactions of the American Electrochemical Society, page 121, there express the opinion that small amounts of graphite exist as such in calcined coke.

For the purpose of my invention, it is not vital what the correct definition of graphite is, as I have found that the solid oxide of carbon which is derived from calcined coke acts as a depolarizer similarly to that derived from Acheson graphite. The available oxygen may be determined by the same methods, irrespective of whether the solid oxide of carbon is obtained from calcined coke or from Acheson or other like graphites. The oxide deflagrates in both cases.

I have found that graphitic oxide made by the known methods may be substituted for manganese dioxide in galvanic cells and particularly in the ordinary type of dry cell containing a zinc anode and a depolarizing mixture contacting with a carbon electrode. The proportions of depolarizer to the graphite or other conductive carbon of the "mix" and to the sal ammoniac or equivalent salt of the electrolyte can be essentially the same by weight as when manganese dioxide is used. The oxidized carbonaceous depolarizer advantageously may be ground with the conductive carbon of the "mix". A method of preparing a depolarizing mix by grinding is the subject of a co-pending application Serial No. 42,093 filed July 7, 1925.

When preparing the oxide of carbon by use of the Brodie mixture or its equivalent I find that it is not necessary to completely oxidize the carbonaceous particles. I have found that it often may be advantageous to only partially oxidize the carbonacous particles. When this is done, each particle consists of a conductive carbonaceous core covered by insulating oxide. This is also advantageous from the standpoint of cost since the first oxidation is the most efficient from the standpoint of the utilization of chemicals. The efficiency of the reaction lessens rapidly as the thickness of the layer of oxide of carbon on the exterior of the carbonaceous core increases. Similarly, a thin layer of oxide of carbon should be more efficacious as a depolarizer, and my experiments tend to confirm this. The particles with which I start may be of the size or fineness now common in dry cell work or may be coarser.

I have further found that it is possible to oxidize a powdered carbonaceous material such as Acheson graphite to such an extent that the ratio of depolarizer to graphite is the correct one to secure the maximum output from a battery, that is, the same ratio may be secured as when mixing a pure oxide of carbon and Acheson graphite, or when mixing manganese dioxide with usual carbonaceous material, to form the "mix". Because the conductive core of each article is covered with insulating oxide, I find that such partially oxidized graphite or other carbonaceous material advantageously may be ground in a ball mill as pointed out in my co-pending application, Serial No. 42,093 filed July 7, 1925. The resulting mixture may be used without further addition of graphite.

I have further found, that oxidized carbonaceous material may be used in a galvanic cell containing some manganese oxide and this is the subject of a co-pending application, Serial No. 42,092 filed July 7, 1925.

I have found that a dry cell made in the usual manner with a zinc cup or container as an anode and a molded cathode about a carbon rod with a gelatinous electrolyte separating the cathode and anode, but in which the depolarizer is oxidized carbonaceous material instead of manganese dioxide, has characteristics similar to those of the manganese dioxide cell. A cell containing oxidized carbonaceous material as a depolarizer has a voltage of about 1.40 to 1.50 when first made but within a few days this drops to a constant of about 1.30 volts. When discharging at a normal rate on closed circuit through a resistance of 4 ohms, the voltage drops rapidly during the first period of discharge but soon reaches a constant of approximately .65 volt and maintains this constant voltage over a long period of discharge.

I have further found that the use of the oxidized carbonaceous depolarizer eliminates gassing to a large extent and almost completely prevents the gelatinized paste or electrolyte from expanding—both troublesome factors in the manganese oxide cell. I attribute these favorable properties of the oxide of carbon cell to the ability of these colloidal oxides to absorb ammonia, which is formed when a dry cell is discharged. This is shown by the presence of only traces of free ammonia in a discharged cell. In the ordinary manganese cell, large quantities of ammonia are liberated during discharge. This allows longer cores to be used in a cup of given size as there is not the necessity for such a large gas space at the top of the cell.

I have further found that the oxygen in an oxidized carbonaceous depolarizer is much more completely utilized than in a manganese dioxide cell. Due to the lower gravity of the oxidized carbonaceous depolarizer, dry batteries made with this material are considerably lighter in weight than those using manganese dioxide.

I have further found that the conductivity of a cell made by my invention does not decrease as rapidly as a cell containing manganese dioxide. This is a result of the return of the oxidized carbon to its original conductive state when the oxygen has been utilized for depolarization. Tests have shown that when Acheson graphite which has been oxidized is used in a dry cell as depolarizer the graphitic oxide returns to a condition approaching the original Acheson graphite, so far as its conductivity is concerned. Therefore, as the oxygen is being utilized, the graphitic oxide which has a high electrical resistance, returns to the highly conductive graphite, thus tending to neutralize the formation of the insulating hydroxides in the cell. The effect of this reaction is shown by the ability of such cells to maintain a high flash (short circuit amperage) during discharge, at a normal rate.

Carbon, throughout the specifications and claims is used in its broader sense, and includes graphite but excludes diamond.

I claim:

1. A galvanic cell containing solid oxidized carbon as a depolarizer.
2. A galvanic cell containing normally solid graphitic oxide as a depolarizer.
3. A dry cell containing normally solid oxidized carbonaceous material as a depolarizer.
4. A dry cell containing a yellow oxide of carbon as a depolarizer.
5. A dry cell containing a colloidal oxide of graphite as a depolarizer.
6. A dry cell containing as a depolarizer carbon particles that have been oxidized in part to solid oxide.
7. A dry cell containing a depolarizer consisting essentially of oxidized carbonaceous material which deflagrates on heating.
8. A galvanic cell containing a depolarizer consisting of partially oxidized carbonaceous material capable of oxidizing ferrous sulphate in an acidulated water solution.
9. A dry cell containing a depolarizer consisting essentially of oxidized carbonaceous material in such proportion as to effectively neutralize the hydrogen liberated during discharge.
10. A dry cell containing a depolarizer consisting of oxidized carbonaceous material so disposed as to effectively absorb ammonia liberated during the discharge.
11. A dry cell containing a depolarizer consisting essentially of carbonaceous material partially oxidized to a solid oxide of carbon.
12. A dry cell having a depolarizing mixture consisting of oxidized carbon, carbonaceous conducting material, salts and water.
13. A cathode mixture for dry cells containing conductive carbonaceous material and oxidized carbon.
14. A mixture for dry cells containing graphite and oxidized carbon.
15. A molded dry cell cathode containing oxidized carbon as a depolarizer.
16. A dry cell having a zinc electrode and having a cathode core therefor containing oxidized carbon as a depolarizer.
17. In a dry cell, the combination of a zinc container, a carbon rod supported therein, a depolarizing mixture inclosing said rod and consisting essentially of a conductive carbonaceous material and oxidized carbon, together with salts and water, and a gelatinized paste separating said depolarizing mixture from the zinc container.

In testimony whereof I affix my signature.

BRUCE K. BROWN.